L. D. MILLS.
PRECIPITATING METALS FROM SOLUTIONS.
APPLICATION FILED MAY 14, 1913.
1,123,778.
Patented Jan. 5, 1915.
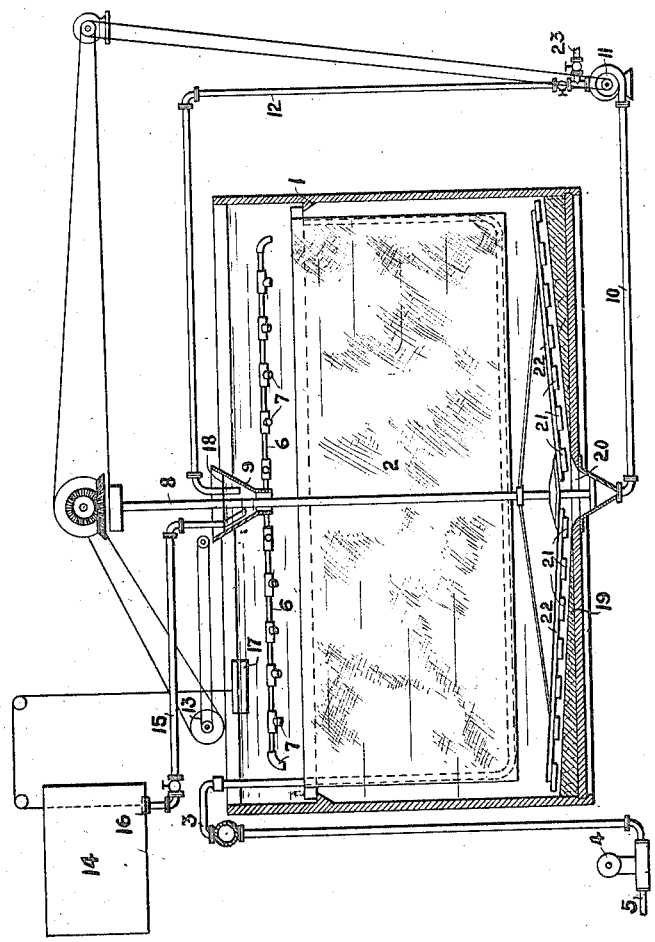
Witnesses
Henry H. Graff
John French
Inventor.
Louis D. Mills
by his attorney
Willard Parker Butler

UNITED STATES PATENT OFFICE.

LOUIS DAVID MILLS, OF JOHANNESBURG, TRANSVAAL, SOUTH AFRICA, ASSIGNOR TO MERRILL METALLURGICAL COMPANY, A CORPORATION OF CALIFORNIA.

PRECIPITATING METALS FROM SOLUTIONS.

1,123,778.   Specification of Letters Patent.   Patented Jan. 5, 1915.

Application filed May 14, 1913. Serial No. 767,512.

*To all whom it may concern:*

Be it known that I, LOUIS DAVID MILLS, a citizen of the United States of America, residing at 46 Commercial Exchange Building, Main street, Johannesburg, in the Province of the Transvaal, Union of South Africa, have invented certain new and useful Improvements in Precipitating Metals from Solutions, of which the following is a specification.

The present invention consists in a filtering process and apparatus for treating solutions of precious metals with mobile precipitant, which may be finely divided zinc, aluminium, charcoal or hydrocarbon or mixtures thereof; and for separating the resulting precipitate from the liquid.

The distinctive feature of the present process as compared with the known filtering precipitation processes consists in maintaining a homogeneous mixture of the pregnant solution and mobile precipitant at the surface of the filtering medium, so that as the solution is passed through said medium the precipitant and precipitate are deposited on the filter as a homogeneous and uniformly permeable cake. Such homogeneity of the mixture is usually maintained by continuously circulating it.

The invention may be carried into effect by means of the apparatus shown in the accompanying drawing which is a vertical section.

1 indicates a vat or other receptacle adapted to hold liquid and containing a number of filter leaves 2. The latter are preferably disposed vertically as shown in order to facilitate the circulation of the solution and precipitant as described hereafter. Suitable means such as the connections 3, pump 4 and delivery pipe 5 therefrom are provided for exhausting the interior of the filter leaves or otherwise producing the necessary difference of pressure between their interior and exterior surfaces, and for disposing of the liquid thereby caused to pass into them.

In the arrangement shown, the fluid mixture of solution and precipitant is distributed below the normal surface of the liquid in the receptacle, but above the filter leaves, by means of a number of hollow arms 6 furnished with numerous outlets 7 which are so arranged as to distribute the mixture uniformly. The arms are preferably revolved slowly, for which purpose they are mounted on a spindle 8 which also carries a hopper 9 from which the liquid and precipitant are fed to the arms.

10 is a pipe connection from the bottom of the vat, 11 a pump and 12 a delivery pipe therefrom by which the mixture drawn from the bottom of the receptacle, is returned into the hopper 9 for re-distribution. Fresh precipitant is delivered to the hopper 9 as required by the device 13.

14 is a source of pregnant solution having a delivery pipe 15 and a valve 16 controlled by a float 17 whereby fresh solution is added to supply the place of that drawn off during operation and thereby maintain the liquid in the vat at constant level. Pipes 12 and 15 dip beneath the surface 18 of the liquid in hopper 9 to prevent detrimental agitation of the solution and oxidation of the precipitant suspended in it.

Provision is made for thoroughly removing the solid matter which tends to collect at the bottom of the receptacle and passing the same into the circulatory system to be re-mixed with the solution. For this purpose in the apparatus illustrated, the bottom 19 of the receptacle is slightly sloped toward a central outlet 20 from which the circulating pump 11 draws its supply. A number of moving plows or scrapers 21 which may be carried by arms 22 projecting from the rotating spindle 8 are arranged to pass the settled material to said outlet 20. A device of this character enables the amount of precipitant not deposited on the filter leaves and not in active circulation to be kept down to a minimum.

In the operation of the device, assuming the receptacle to be charged with solution containing precipitant in suspension or admixture, the actuation of the exhausting pump 4 causes a flow of solution into the filter leaves 2 and the deposition on the surfaces thereof of a cake consisting of precipitant, together with such quantities of precipitate as may have already been formed by the interaction of the precipitant with the liquid in which it is suspended. The fine granular structure of the cake causes every particle of the solution which continues to pass through it to be brought into very intimate contact with the precipitant whereby a very complete impoverishment of the solution is brought about; and as the impoverished liquid is at once—by passing through the filter medium—removed from further contact with the precipitate, re-solution of the latter is obviated. As is well known, a filter cake thus formed by immersing the filter leaves in a homogeneous mixture of liquid and solid matter tends automatically to attain and maintain homogeneity of structure and uniform permeability throughout; so that, in the present case, the whole of the solution is equally subjected to the action of precipitant. As more and more solution passes through the filter, so is the deposit of precipitant thereon replenished and the precipitating activity of the cake is maintained. When it is desired to recover the precipitate, the supply of fresh solution and precipitant is shut off and as much of the remaining liquid as is possible is drawn off through the filter leaves by pump 4. The pump 4 may then be stopped and the precipitate sluiced off into the bottom of the vat from which it is removed by the circulating pump and passed by its branch outlet 23 to such further treatment in a filter press or otherwise as may be expedient.

What I claim and desire to secure by Letters Patent is:—

1. The process of precipitating metals from their solutions which consists in maintaining a homogeneous mixture of said solutions and a mobile precipitant at the surface of a filter medium, withdrawing solution through said medium whereby the solid matter suspended therein is deposited as a homogeneous and uniformly permeable layer on said medium, and circulating the excess mixture adjacent to said filtering medium.

2. The process of precipitating metals from their solutions which consists in maintaining a homogeneous mixture of said solutions and a mobile precipitant at the surface of a filter medium, withdrawing solution through said medium whereby the solid matter suspended therein is deposited as a homogeneous and uniformly permeable layer on said medium, collecting the heavier settled particles of the participant and precipitate and circulating the mixture containing said heavier particles adjacent to said filter medium.

In testimony whereof I affix my signature in the presence of two witnesses.

LOUIS DAVID MILLS.

Witnesses:
WESLEY E. JOHN,
J. WARREN VENNING.